Aug. 17, 1943.　　　P. C. McLEMORE　　　2,327,204
METHOD OF CULTIVATION OF PLANTS
Filed Oct. 11, 1939　　　2 Sheets-Sheet 1
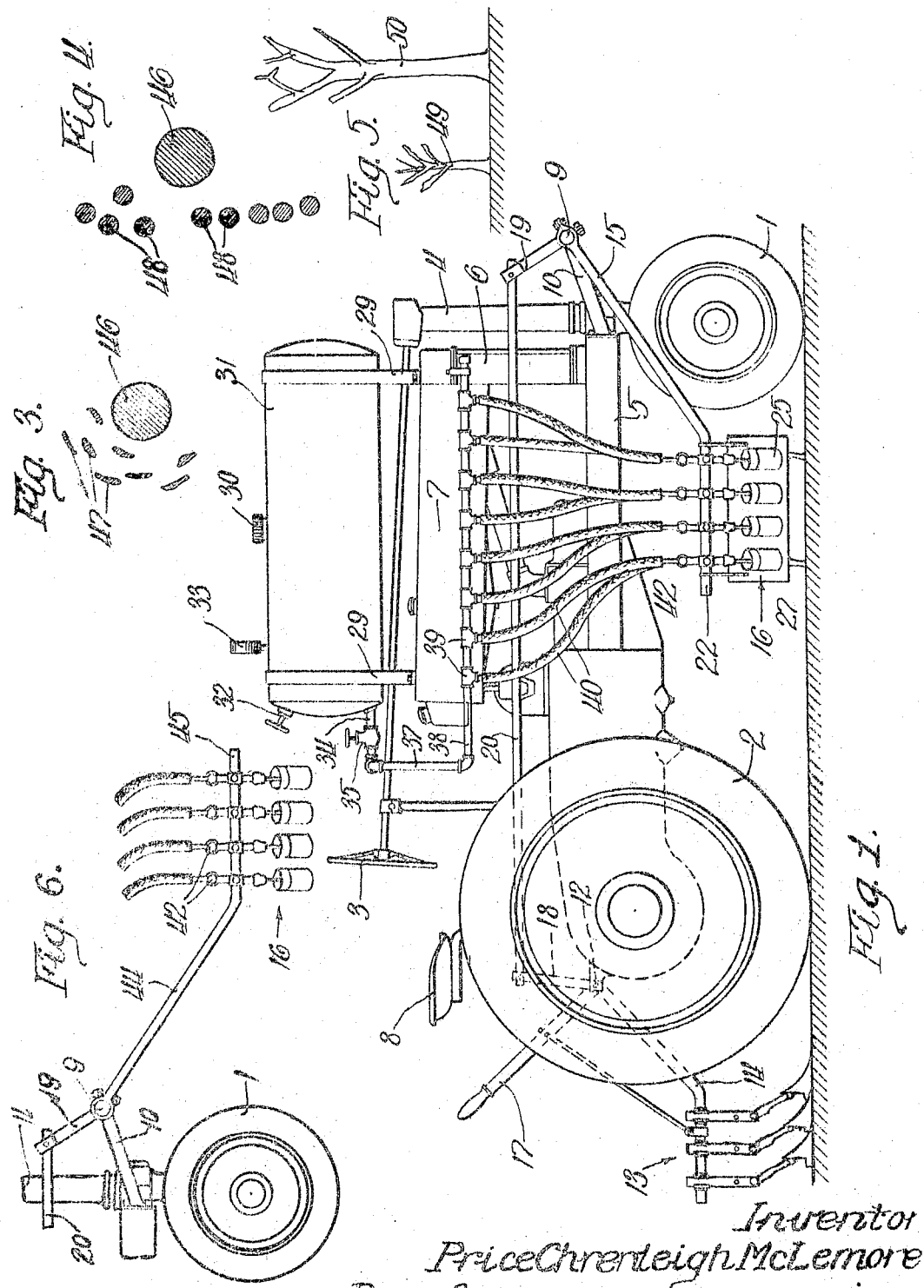
Inventor:
Price Ahrenleigh McLemore

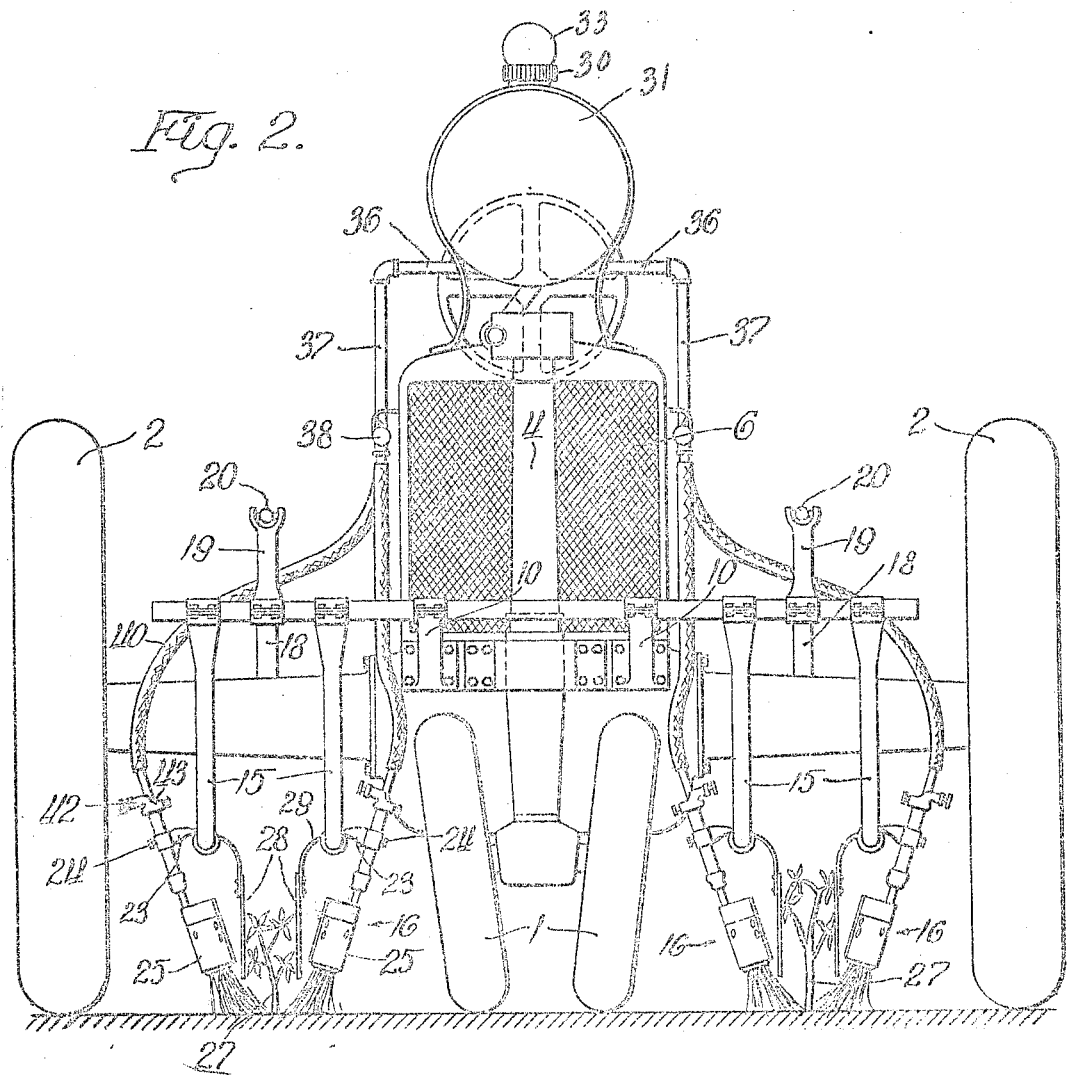

Patented Aug. 17, 1943

2,327,204

UNITED STATES PATENT OFFICE 2,327,204

METHOD OF CULTIVATION OF PLANTS

Price Chrenleigh McLemore, Montgomery, Ala.

Application October 11, 1939, Serial No. 298,870

23 Claims. (Cl. 47—58)

My invention relates to a method of cultivation of plants.

While the specific illustration and detailed description is directed to the cultivation of cotton plants, it is to be understood that this is by way of exemplification and not by way of limitation. The invention is applicable to the cultivation of other crops, such as corn, legumes, potatoes, tomatoes, sugar cane, and even to crops such as beets. It may be applied to the cultivation of annual plants or perennial plants, and even to such types as bushes and trees, if desired, particularly when it concerns the problem of suppressing volunteer vegetation such as weeds or casual or incidental plants, as against those intended to constitute the crop or to furnish the crop.

Also, while the method herein disclosed is particularly applicable to the cultivation of row crops, the invention in its broader aspect is not limited to row crops, as will be apparent hereinafter.

The principle upon which my invention proceeds is the discovery that there is a marked difference in the resistivity of plants to the application of heat, particularly heat at high temperature. It is known that frost and cold affect various plants quite differently. I find that there are at least equal differences in their reaction to applied heat, although the differences in reaction are intensified, according to my invention, inasmuch as the heat is applied under control as to place or point of application, as well as in respect to time, volume and intensity. The plant that will endure cold does not necessarily react in the same manner to applied high temperature.

I have found that by the application of heat under suitable control, as to time, temperature, volume, and point or region of application, certain of the varieties in a stand of vegetation of mixed character may be selectively destroyed. The useful application of the principle involved in my invention resides not so much in the natural resistance to hotter or colder climates of different kinds of plants or vegetation, but rather in the different effect of, or reaction to suddenly or rapidly applied heat, particularly at high temperatures, that is, applied at a high temperature differential. The present process is comparable to singeing. The shape of a blade of grass is such that it presents a large area for a given volume, and also, each point in its cross section is at only a minimum distance from the surface. Hence when a flame is applied to both grass blades and to a stemmed plant, the grass may be cooked, scorched and burned before the stemmed plant receives substantial injury. This results chiefly from the shape of the subject treated. Rapidly applied heat, that is, a high temperature gradient, will also selectively act as between a smaller plant and a larger plant of the same species.

This principle of selective reaction to applied high temperature finds its most useful, though by no means only, application to the cultivation of row crops such as cotton, and it has particular value in the case of cotton for reasons some of which will hereinafter appear.

The type of plant which lends itself most readily to this mode of cultivation is that which within a short time, say a few weeks after planting, grows sufficiently and is of such a character that it will produce or develop a stem system that is materially larger in body, both as to diameter and as to height, than the obnoxious vegetation which is to be destroyed or inhibited.

Advantage may be taken in the differential in growth between the stem plant and the grass or other obnoxious vegetation by setting out young plants instead of growing the plants in place from seed. For a crop such as cotton, which if protected from freezing will produce for several years on the same root and stem system, the differential in size may be obtained at an earlier date than would be possible from seed grown plants. Since, however, most row crops are grown in place from seed, the specific description of an embodiment of my invention herein set forth assumes seed planting. Since an initial rapid growth, or an advanced stage of growth are favorable factors, I intend the same to be included within the scope of the present invention. The process method of my present invention finds particular application on any row crop which, by natural or artificial means, may be made to yield a stem system which is materially larger, and hence more heat resistant, than the accompanying obnoxious vegetation.

The chief object of the present invention is to provide a method of cultivating crops, particularly such as cotton, at a lower cost than is at present attainable.

It has heretofore been attempted to mechanize certain steps in the production of cotton fiber. The original bottle-neck in the production of cotton was in the separation of the seeds from the fiber, which was solved by the cotton gin. The planting of the seeds by machinery is, of course, a simple matter. Harvesting the cotton, as by mechanical cotton pickers, is a demonstrated possibility but for the present is uneconomic for the reason that up to the present time no adequate and universally applicable mechanical device for destroying or inhibiting the growth of obnoxious vegetation, such as grass and weeds, has been developed. Hence hand operation, (the so-called hand chopping of cotton) has been unavoidable. With the requirement for human labor in chopping the cotton there is little economic advantage in use of a mechanical cotton picker when the labor available for that step must be maintained on account of the necessity for chopping the cotton in the earlier stages.

Another object of the present invention is to provide a method of cultivating cotton by machinery so that hand chopping may be dispensed with and the entire operation of raising and harvesting cotton may be mechanized.

A further object of the invention is to improve the crop in quality and yield. By the use of the present method, less disturbance of the root system of the cotton plant is occasioned, and the crop proceeds more rapidly. Also, less waste of fertilizer is entailed by the use of the present process, and I have found that crops such as cotton which normally require considerable quantities of chemical fertilizers to insure normal yield and quality, may be cultivated with a material reduction in the quantity of fertilizer required. This reduction in quantity of fertilizer is accomplished by the more effective removal of the obnoxious vegetation than heretofore was possible. The reduction in the amount of fertilizer used may also in part be due to transformations, either chemical or physical, in the fertilizer due to the heat employed, with the result that the active constituents are rendered better available to the plants throughout their growing period, instead of being lost by solution in rain or other irrigation waters.

An incidental object of the invention is the destruction of insect pests such as the weevil, the cut worm, army worm, the grasshopper, etc., whereby control over these destructive insects is effected to a marked degree.

In the preferred practice of my invention heat is generated in the form of a blast of flame which is caused to impinge upon the ground alongside of the plants in the row in such a manner as to destroy the obnoxious vegetation without at the same time doing any substantial injury to the row crop plants. I do not intend to limit the broader aspects of the invention to the preferred method of generating and applying heat, since other modes of furnishing the necessary heat will be apparent to those skilled in the art.

Now in order to acquaint those skilled in the art with the method of my invention I shall describe, in conjunction with the accompanying drawings, a specific example thereof.

In the drawings:

Figure 1 is a side elevational view, more or less diagrammatic, of an apparatus suitable for practising the method of my invention, comprising a tractor provided with burners and fuel supply means;

Figure 2 is a front elevational view of the same, showing the method of treating the obnoxious vegetation and the crop plants;

Figure 3 is a diagram illustrating how differences in form affect the selective ability to withstand applied high temperatures;

Figure 4 is a similar diagram, showing how variations in size of cross section affect the resistivity to high temperatures;

Figure 5 illustrate how the same plant at different stages of growth has different resistivity to applied high temperatures; and Figure 6 is a fragmentary illustration of a modification of the apparatus shown in Figures 1 and 2 where the burners are carried in advance of the tractor.

As a specific example of my invention, the cultivation of cotton according to the present invention will now be described.

The field to be planted is plowed, bedded and planted as usual, with the exception that, preferably, care is taken to produce as flat a seed bed as possible. In general, planting should follow immediately after bedding in order to insure a clean seed bed. As soon as the cotton reaches a good and full stand it is first plowed and the dirt thrown back towards the cotton. During the next several weeks the cotton should be plowed as often as may be necessary to prevent the growth of obnoxious vegetation, preferably at least once a week. While not essential, materially improved results are obtained if as much dirt as possible, without covering the plant, is thrown around the cotton by each plowing operation. Cultivation is continued in this manner until the cotton plant has four leaves, or, in other words, is about four weeks old. At about this stage of growth the plants may be blocked into a stand of hills each containing four to six stalks. Blocking may be done in a number of ways, as, for example, by plowing across the rows in such a manner as to cover or turn under all cotton except the desired hills, which preferably should be spaced about two feet on centers. Blocking may also be done, if desired, by hand labor, whereby the unwanted plants are removed by hoeing or by any mechanical contrivance which will, in effect, remove the unwanted plants. After blocking the cotton should, in general, be swept at once. For the next two or three weeks sweeping is continued as often as may be necessary to keep all young grass covered, preferably at least once a week.

When about six weeks old the cotton will have grown to a fairly substantial size, each stalk being, say about $\frac{1}{8}$" in diameter and from 4" to 6" tall. By this time the obnoxious vegetation will have become very difficult to control by sweeping alone. The application of heat may now be employed to effect the destruction of the obnoxious vegetation. As previously noted, the preferred form of applying the heat is in the form of a flame.

A protracted series of experiments and tests have shown that when using a flame, 1" in diameter by 6" long, as generated by the vaporization and combustion of kerosene in a hand blow torch, direct contact with the hottest part of the flame for a period of time varying from $\frac{1}{6}$ to 3 seconds is required to effect the destruction of the obnoxious vegetation. Six week old cotton plants, on the other hand, will withstand a flame of similar size and intensity, when directed upon the ground at the base of the stalk, for from 15 to 30 seconds, without injury to the plant itself. By suitably controlling the method of applying the flame, the intensity and size of the flame or flames, sufficient heat may be applied to the obnoxious vegetation to effect its destruction without doing substantially any injury to the cotton. For example, a man or a crew of men, each equipped with a torch type burner and accessories may remove the obnoxious vegetation by simply directing the flame at the desired points all over the desired area as they traverse the cotton field by moving up and down the rows. For this purpose I have found that a flame of from 2" to 4" in diameter and from 18" to 36" long, as generated by the vaporization and combustion of hydrocarbon distillates such as gasoline, kerosene, or furnace oil, is satisfactory. While the above is the preferred size of flame, larger or smaller flames may be used and not intended to be precluded. The flame so generated is most effective when it is caused to impinge upon the ground at or near its mid-point, which, in general, is the point of maximum flame temperature.

In the practice of this from of cultivation the flame may be directed either to effect the destruction of the obnoxious vegetation over the entire area of the row, center and all, or over only a limited area, say two to four inches on both sides of the row. In general I prefer the latter procedure, as a lower unit cost is involved and since obnoxious vegetation in the center may be controlled by plowing. Either procedure, however, is a material improvement over previous methods of cultivation and may be used as desired.

Although it is not essential, I prefer that the cotton be swept after each burning. Burning may be repeated as often as is necessary to suppress the obnoxious vegetation, preferably once a week for the next four to six weeks or until mature plants are obtained.

As the plants grow older, more intense heat for longer intervals of time may be applied to effect the destruction of the obnoxious vegetation, without injury to the cotton plants themselves. In the latter stages of growth, obnoxious vegetation of practically any size may be removed by flaming. With the young cotton, however, care must be exercised to prevent injury to the cotton plant. For this reason it is preferable that the cotton be swept during the interval prior to the first burning often enough to prevent the growth of obnoxious vegetation until the plants are large enough to withstand flaming, as previously noted. The first several burnings should preferably, therefore, be frequent enough so as to insure that no obnoxious vegetation reaches an advanced stage of growth. Tests have shown that grasses and other forms of obnoxious vegetation are burned almost instantly by the torch flame if the flame is applied as soon as the obnoxious vegetation breaks through the ground.

While my method permits the more efficient utilization of the fertilizer by the cotton plant and is also effective to a marked degree in the control of pestiferous insects and worms, I prefer in general that insecticides and fertilizers be used in the normal manner and quantity as required by local conditions.

As previously noted, the burning is continued at intervals until a mature and fruiting plant is obtained. The burning may then be discontinued and the cotton left until the bolls open. The cotton may then be picked, either by hand labor or by a mechanical device, as desired.

In the practice of my invention by hand as explained, manual transportation of the torch and accessory equipment, such as the fuel tank, is necessary. While this is convenient and practical, especially for small crops and special areas, in general I prefer that the burners, air pump, fuel tanks and other accessory equipment be mounted in a suitable and advantageous manner on a vehicle which may be drawn by beasts of burden or by mechanical power, such as a tractor. When a tractor is available an additional vehicle is, in general, unnecessary as the equipment can be mounted directly on the tractor itself to good advantage, as shown in the embodiment illustrated in Figures 1 and 2.

Referring now to Figures 1 and 2, I have shown a tractor of known construction, comprising dirigible wheels 1 at the front and driving wheels 2 at the rear. The front wheels 1 are steered by a suitable steering mechanism including the steering wheel 3, operating mechanism in the front post 4 to steer the tractor as desired. The front and rear wheels are connected by a suitable chassis frame 5, and upon this frame and partly in it is mounted a power plant including an internal combustion engine having suitable fuel supply means, an exhaust pipe, and suitable controls for governing the starting, stopping, and speed of the engine. The tractor is provided with an automatic speed governor for maintaining a fixed speed, as is well known in the art. A cooling system, including the radiator 6, is mounted at the front end of the chassis frame and a suitable hood 7, which forms a protection for the engine and houses fuel and water tanks for the engine, extends rearwardly from the top of the radiator 6. The tractor is provided with a suitable seat 8 for the operator, and in convenient position from the seat are the usual controls for governing the operation of the tractor. The rear wheels 2 are spaced to go outside of two rows and the front wheels 1 are located so as to travel between the same two rows, as is clear from Figure 2. This type of tractor, commonly employed for agricultural purposes, is equipped with a crossbar 9 at the front. The cross bar 9 is secured to the frame of the tractor as by means of brackets 10—10. This type of tractor is frequently supplied with sweeps either extending in front of the cross bar 9 or to the rear of the same. Likewise, at the rear of the tractor a similar cross bar 12 mounts the rear sweeps 13 upon a suitable mounting arm 14. A similar arm 15 connected to the cross bar 9 at the front may normally support sweeps such as those at 13 but, in the present construction, there is held mounted upon the lower part of the arm 15 a bank of oil burners 16. By means of a lever 17 or like equipment, and through the connecting arms 18, 19 and connecting rod 20, the sweeps 13 and the burners 16 may be raised and lowered. Suitable bracing means (not shown) may be employed for supporting the sweeps and burners. Power mechanism may be employed, if desired, to raise and lower these parts.

The arm 15 has a horizontal extension 22 at the rear end and upon this horizontal portion are mounted, by means of brackets 23, 23 the individual burners 25, 25. The burners are adjustable as to height in the brackets 23 as by means of the set screw adjustment 24. In each of the banks of burners here shown I have indicated four individual burners 25, but obviously the number may be larger or smaller, as desired. The burners 25, 25 may generate a free flame of from 2" to 2½" in diameter by 12" to 16" long, and they are spaced from the surface of the ground a distance of approximately 6", in the specific instance here illustrated, so that the flames from these burners bathe the ground and the stems of the cotton plants 27. Preferably, although not necessarily, heat barriers in the form of asbestos or Transite plates 28 are carried on brackets 29 from the arm extensions 22, 22 so as to interpose their insulating effect between the burners and the foliage and tops of the cotton plants or other crop plants in the row. These shields are not strictly necessary, but they permit the burners to be brought more closely together adjacent the foot or stem of the plant without doing any unnecessary injury to the foliage and tops. Since the bodies of the burners 25, 25, particularly in the blow torch type of burner, grow quite hot these shields, in addition to limiting the projection of flame, limit or guard the plants against contact with the hot burner parts.

A supply tank 31 is carried on brackets 29, 29 upon the vehicle. In this case the brackets are mounted upon the top of the tractor hood 7, although any other suitable, preferably elevated, position may be employed. The location of the tank 31 is not of importance except that where gravity feed is desired the tank should be suitably elevated. The tank may be carried upon another vehicle or at some other location on the same vehicle, if desired. The tank 31 is provided with a filler cap 30, which is preferably capable of effecting an air seal, and the tank in the present instance is adapted to be put under air pressure by means of a hand air pump 32, a gauge 33 being provided to indicate the pressure in the tank. For burners of the blow torch type here illustrated, this pressure may be of the order of from 10 to 50 lbs. per square inch.

As shown in Figure 2, four banks of burners 15, for servicing two rows of plants simultaneously, are provided. From the tank 31 a supply line 34, provided with a suitable shut-off valve 35, extends to a cross pipe 36, each end of which is extended downwardly as at 37 to connect with a manifold 38 at each side of the tractor. The manifold 38 is provided with T connections 39, 39 leading off through suitable flexible connections 40, 40 to the individual burners 25. The flexible connections may be of a rubber-like material immune to the action of oil, such as Neoprene or Thiokol, or alternatively it may be a flexible metal tubing, or flexible metal hose, or armored hose, or any other suitable flexible pressure and oil-resisting connection. Each flexible hose 40 connects to its individual burner 25 through a regulating valve 42. A removable screen is mounted at 43 in the line between the fuel supply tank and the burner tip so as to screen or strain out any scale or other solid impurities which might plug up the burner orifices.

I have shown the vaporizing type of burner, such as the common blow torch embodies. The burners are initially heated up and upon becoming heated they serve to vaporize the fuel which is fed to them under pressure and project a hot, colorless and smokeless flame, as is well known to those skilled in the art. The bank of burners 15, instead of being carried rearwardly on the arm 15 may be carried on an arm 44 projecting forwardly of the cross bar 9, the bank of burners, in that case, being mounted upon a horizontal portion 45 of the arm 44 so as to be carried in front of the vehicle instead of behind the front wheels 1.

The particular form of burner is optional within my invention. That is to say, while I have shown the vaporizing type of burner (and this is the preferred type), I intend to include within the invention any alternative form of burner or heat projecting means for accomplishing the same purpose in substantially the same manner. For example, an atomizing type of burner depending upon the delivery of oil through an orifice at very high pressure may be utilized. In that case, a suitable power pump and storage tank may be employed. The pump in that case may be driven from the tractor engine or any other suitable source of power, and one or more or all of the burners may be supplied with pressure from the same source.

An air atomizing or steam atomizing burner of the cannon type may also be employed, if desired. In that event, means for generating a suitable atomizing fluid pressure, as, for example, an air compressor and tank, or a steam boiler, for generating the atomizing pressure, may be carried by the tractor or on a vehicle operating in conjunction therewith.

In general, I intend to include within my invention any suitable means for projecting heat or a fluid conveying heat, for the purpose of selective destruction of the obnoxious vegetation while saving the desired crop plants. The vaporizing or blow torch type of burner is generally preferable for the reason that an unconfined flame generated by this form of burner is shorter,—that is, burns in shorter length and in less space than an atomizing type of burner, although I do not mean by this to exclude others by the above indicated preference.

The operation of the device shown in Figures 1 and 2 is as follows: The operator of the tractor having put the burner banks 15 into operation, drives the tractor along the two rows as indicated in Figure 2 at a speed which is adjusted to the flame and to the selective action upon the crop plants and obnoxious vegetation as determined by the size of the plants 27, the density of the obnoxious vegetation, and similar factors. Usually the tractor is driven at a rate of about four miles per hour, at a substantially uniform speed throughout the length of the row. When the flame is developed in good volume and directed upon the ground at the base of the crop plants 27, it cooks, sears and singes the grass and other obnoxious vegetation without doing substantial injury to the crop plants, such as the cotton plants 27 illustrated in Figure 2. One reason why a stemmed plant is less subject to injury than grass or other obnoxious vegetation of that type is illustrated in Figure 3.

In Figure 3 I have shown a cross section, and diagrammatically, the stem 46 of a stemmed plant. This is, of course, on an enlarged scale. At 47 I have shown in cross section, and diagrammatically, leaves of grass constituting the obnoxious vegetation. Now it will at once be seen that the ratio of area to volume of the blades of grass as compared with the stem of the cotton plant is immensely greater. Likewise, the distance of any living cell in the grass blade from the surface is very much less than the distance of a cell in the central part of the stem 46 from the surface. So that, even if the stem 46 should be singed upon the surface, the living cells in the central part of the stem would receive no injury, whereas the entire blade of grass would be destroyed.

Even in the case of stemmed vegetation of smaller diameter than that of the crop plant 46 as shown in Figure 4, it will at once be appreciated that the smaller stems 48, 46 would be destroyed before the stem 46 would receive substantial injury if the two were subjected to a high temperature flame for a short period of time.

The principle of selectively causing injury by the application of heat is applicable to plants of the same kind of different size, as may be seen in Figure 5. Assume that the older plant 50 and the younger plant 49 are subjected to the same projected heat, it will be obvious that the younger plant 49 will perish before the older plant 50 is seriously affected. Quite obviously, as between vegetation of a lighter structure, such as blades of grass, and that of a heavier structure, such as stemmed plants, there is a wide margin which my invention may be employed to take advantage of.

My copending application, Serial Number 364,140, filed November 4, 1940, as a division of the instant application, discloses and claims apparatus suitable for practicing the method of the present invention.

While I have indicated the preferred manner in which the method of my invention may be practiced, it is to be understood that the above specific illustration is but one exemplification of the basic concept, and that I do not intend to be limited by the specific illustration except as the following claims are specifically directed to the same.

In the more or less schematic showing of Figures 1 and 2, four burners on each side of each row are shown. Obviously the number of burners may vary with local conditions and different crops. However, the burners shown, when attached to a tractor running four miles per hour and generating flames from 2" to 2½" in diameter by 12" to 16" long if directed into free space, are on the average satisfactory for the cultivation of cotton as previously outlined. For other row crops, or other local or unusual conditions, either fewer or more burners may be used as required, and it is to be understood that the size of the plants determines to a large extent the intensity and amount of heat which they will withstand without injury, and the operator is expected to vary the procedure accordingly.

One great advantage of the present system of cultivation is that it is substantially independent of the soil conditions. That is to say, even though the ground might be too wet for cultivation by plowing or sweeping, the method of my invention may be employed if the ground is firm enough to support the tractor, or any other conveyance suitable for the application of heat in accordance with my invention.

The sweeps shown in Figure 1 at the rear of the tractor are preferably employed immediately after flaming, but it is to be understood that this is optional and they may be dispensed with.

The operation of flaming, according to my invention, appears to have a greater retarding effect upon the growth of volunteer or noxious plants than the mere cutting off of as much as is destroyed by the flaming. In other words, flaming appears to give a greater setback to plant growth than does equivalent injury by mechanical means.

I claim:

1. The method of selectively suppressing obnoxious vegetation incidental to growing crop plants which comprises subjecting the obnoxious vegetation and the standing crop plants simultaneously to high temperature heat for a period long enough to selectively injure the obnoxious vegetation without substantial injury to the crop plants.

2. The method of selective suppression of obnoxious vegetation growing about stemmed crop plants which comprises subjecting the obnoxious vegetation and the lower parts of the standing crop plants simultaneously to a blast of fluid at a temperature in excess of the boiling point of water, and for a time limited to that which will injure the obnoxious vegetation without substantial injury to the crop plant.

3. The method of destroying obnoxious vegetation growing about standing stemmed plants which comprises directing a blast of flame upon the ground adjacent the plants to bathe the obnoxious vegetation and the stems of the standing plants in flame and removing the flame after the obnoxious vegetation is injured and before the plants receive substantial injury.

4. Method of treating a standing row of stemmed crop plants to suppress obnoxious vegetation growing about the crop plants which comprises directing blasts of hot fluid upon the ground, one on each side of the standing row, said blasts bathing the vegetation and the stems of the standing crop plants simultaneously in the hot fluid and moving the blasts of hot fluid along the row at a rate which will continue the application of heat long enough to injure the obnoxious vegetation without substantial injury to the crop plants.

5. The method of selectively suppressing obnoxious vegetation growing about crop vegetation which comprises subjecting both forms of vegetation, simultaneously and for a period of time long enough to produce injury to the obnoxious vegetation without substantial injury to the crop vegetation, to a blast of hot fluid carrying the vapor of a compound the melting point of which is above the freezing point of water.

6. The method of treating a row of cotton plants to suppress obnoxious vegetation growing about the plants, which comprises directing blasts of hot fluid comprising hydrocarbon flames upon the ground, on each side of the row, said blasts bathing the vegetation and the stems of the plants simultaneously in the hot fluid, and moving the blasts of hot fluid along the row at a rate which will continue the application of heat long enough to injure the obnoxious vegetation without injury to the cotton plants.

7. Method of selectively suppressing undesired vegetation growing indiscriminately among standing crop plants that are more resistant to heat than is said undesired vegetation, which comprises simultaneously subjecting the undesired vegetation and the standing crop plants to intense locally applied heat for a time long enough to do material injury to said undesired vegetation without doing material injury to said crop plants.

8. Method of suppressing grass growing about stemmed crop plants, which comprises subjecting the grass and the stems of the standing crop plants simultaneously to locally applied heat until the grass is burned, and discontinuing the heat before the stemmed crop plants are substantially injured.

9. Method of suppressing obnoxious vegetation growing about a standing stemmed crop plant which comprises simultaneously heating locally the obnoxious vegetation and the stem of the standing crop plant and discontinuing the heat after the obnoxious vegetation has been injuriously heated and before the stemmed crop plant has been injuriously heated.

10. In the cultivation of stemmed crop plants growing in a row, the method of selectively suppressing weeds among the crop plants in and along the row which comprises projecting a hydrocarbon flame against the ground adjacent the bases of the stems of the crop plants on each side of the row, and bathing the weeds and the bases of the stems of the crop plants with said flame, and moving said flames along the row at a rate of movement which will allow the flames to burn the weeds without doing substantial injury to the stemmed crop plants in the row.

11. In the cultivation of stemmed crop plants growing in a row, the method of selectively suppressing weeds among the crop plants in and along the row which comprises projecting a hydrocarbon flame against the ground adjacent the bases of the stems of the crop plants on each side of the row, and bathing the weeds and the bases of the stems of the crop plants with said flame, moving said flames along the row at a rate of movement which will allow the flames to burn the weeds without doing substantial injury to the stemmed crop plants in the row, and simultaneously shielding the upper parts of the stemmed crop plants from the heat of the flames.

12. Method of suppressing volunteer vegetation growing about a standing row of crop plants, which comprises projecting a blast of hot fluid downwardly alongside the crop plants in the row to strike the volunteer vegetation and spread along the ground about the base of the crop plants, shielding the crop plants above the base of the same from the heat of the blast, and moving said blast longitudinally along the row at a rate which will allow the blast to injure the volunteer vegetation without substantial injury to the crop plants.

13. Method of suppressing volunteer vegetation growing about standing crop plants that are more resistant to heat than is the volunteer vegetation, which comprises directing a flame downwardly upon the volunteer vegetation upon at least one side of the standing crop plants to scorch the volunteer vegetation, and moving said flame away before the crop plants are substantially injured.

14. Method of suppressing volunteer vegetation growing about standing crop plants that are more resistant to locally applied high temperature heat than is the volunteer vegetation which comprises projecting a flame downwardly and laterally onto the ground in the vicinity of the crop plants to bathe the bases of the crop plants and the volunteer vegetation in the hot gases of the flame for a time sufficient to cause substantial damage to the volunteer vegetation, and moving said flame away before the crop plants are substantially injured.

15. Method of suppressing volunteer vegetation growing about a row of standing crop plants that are more resistant to locally applied high temperature heat than is the volunteer vegetation which comprises applying intense heat locally to the lower parts of the plants in the row, in succession and simultaneously applying the said heat to the volunteer vegetation adjacent the crop plants, the said application of heat being of short enough duration not to injure substantially the crop plants in the row and long enough to do substantial injury to the volunteer vegetation.

16. In the cultivation of standing crop plants the process of selectively destroying concomitant volunteer vegetation classed as weeds and which volunteer vegetation is less resistant to flame than are the crop plants which comprises projecting a blast of flame from a fluid fuel burner upon the ground whereby the flame is spread out and bathes the bases of the crop plants and concomitant volunteer vegetation simultaneously and indiscriminately in the hot gases of the flame for a time long enough to produce a destructive effect upon the volunteer vegetation and removing the flame before substantial injury has been done to the crop plants.

17. The method of destroying volunteer vegetation classed as weeds growing about a crop plant, which volunteer vegetation is less resistant to flame applied at substantially the surface of the ground than are the crop plants, which comprises directing a flame from a fluid fuel burner along the surface of the ground about the volunteer vegetation and the bases of the crop plants to selectively burn the volunteer vegetation without substantial injury to the crop plants.

18. In a stand of vegetation consisting of crop plants and weeds wherein the weeds are less capable of surviving the application of flame along the surface of the ground than are the crop plants, the method of selectively destroying weeds which comprises projecting a flame from a burner diagonally downward toward the ground to bathe the bases of the crop plants and the weeds in the hot gases of the flame, to an extent which will do substantial damage to the weeds and moving the burner laterally past the crop plants before substantial injury is done to the crop plants.

19. In a stand of vegetation consisting of crop plants and weeds wherein the weeds are less capable of surviving the application of flame than are the crop plants, the method of selectively destroying weeds which comprises projecting a flame diagonally downwardly toward the ground in a plane substantially transverse to the row, the flame striking the ground at the side of the row and extending along the ground to subject the bases of the crop plants and the weeds in the row to the hot gases of the flame, and simultaneously moving the flame laterally along the row at substantially a predetermined rate of speed so as to subject the plants in the row and the weeds adjacent them to the heat of the flame for a time short of that which will cause substantial injury to the crop plants but long enough to do substantial injury to the weeds.

20. The method of row cultivation of growing crop plants of a type which is characterized by development of a substantial length of stem, which comprises, in the earlier stages of growth of the crop plant plowing along the row on each side to retard the growth of volunteer vegetation in and along the row until the crop plants develop a substantial length of stem whereby the crop plants become more resistant to high temperature heat applied locally at the surface of the ground than does the retarded volunteer vegetation, then projecting a flame downwardly and laterally onto the ground in the vicinity of the crop plants to bathe the bases of the crop plants and the volunteer vegetation in the hot gases of the flame for a time sufficient to cause substantial damage to the volunteer vegetation, and moving said flame away before the crop plants are substantially injured.

21. The method of claim 1 wherein the applied high temperature heat is of the order of that obtained with a bank of four burners each having a flame about two to two and one half inches in diameter and twelve to sixteen inches long moved along the row at the rate of substantially four miles per hour.

22. Method of cultivating cotton planted in a row from an early stage of growth to an advanced stage of growth which comprises plowing one or more times along each side of the row of young plants to uproot weed growth along the sides of the row and to sweep soil toward the center of the row whereby to discourage weed growth in and along the row until the plants are about six weeks old at which time they have developed a substantial length of free stem, then projecting flame diagonally downward upon the ground at the side of the row crosswise of the row to bathe the lower ends of the stems of the crop plants in the row and the weed growth in and along the row in flame, and simultaneously moving the flame along the row whereby the weed growth and the stems of the plants are subjected to the hot gases of the flame long enough to selectively injure the weed growth without substantial injury to the crop plants.

23. The method of cultivating a row of crop plants which comprises performing mechanical cultivating operations along the row while the plants are in an early stage of their growth to discourage weed growth adjacent said plants in and along the row, to enable said plants to acquire a substantial advantage in growth over the weeds in and along the row, and thereafter discouraging weed growth in and along the row adjacent said plants by projecting flame from a burner against the weeds and the base portion of the plants to bathe the same in flames, and moving the burner along the row at a steady rate subjecting the weed growth and crop plants to the action of the flame for a period of approximately $\frac{1}{10}$ second to 30 seconds, depending upon the stage of growth, whereby to cause the flame to substantially injure the weed growth without substantially injuring the crop plants.

PRICE CHRENLEIGH McLEMORE.